April 23, 1957
S. SCHWORK
2,789,642
ALL PURPOSE ADJUSTABLE CUTTER
Filed Nov. 26, 1954
2 Sheets-Sheet 1
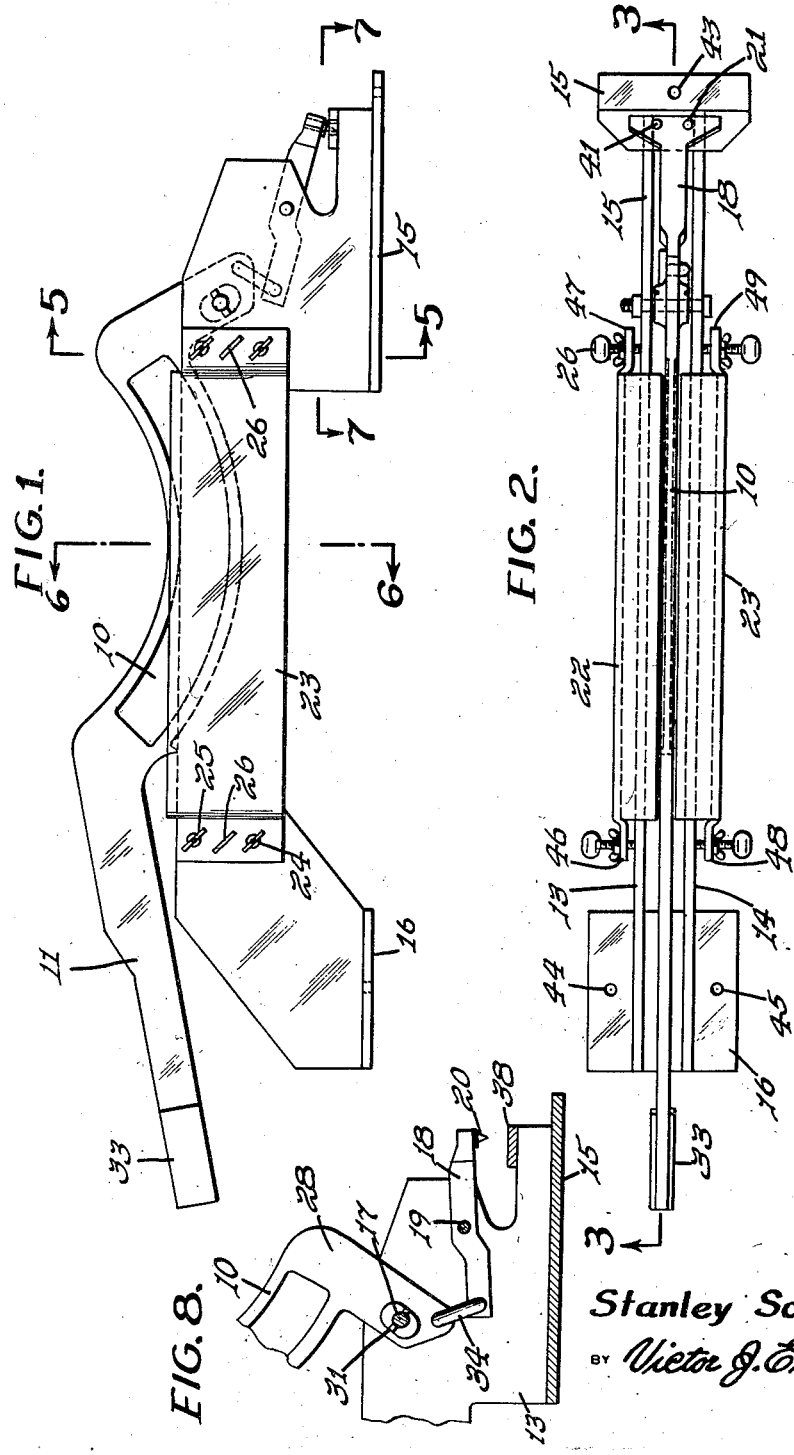
INVENTOR.
Stanley Schwork
BY *Victor J. Evans & Co.*
ATTORNEYS April 23, 1957  S. SCHWORK  2,789,642
ALL PURPOSE ADJUSTABLE CUTTER
Filed Nov. 26, 1954  2 Sheets-Sheet 2
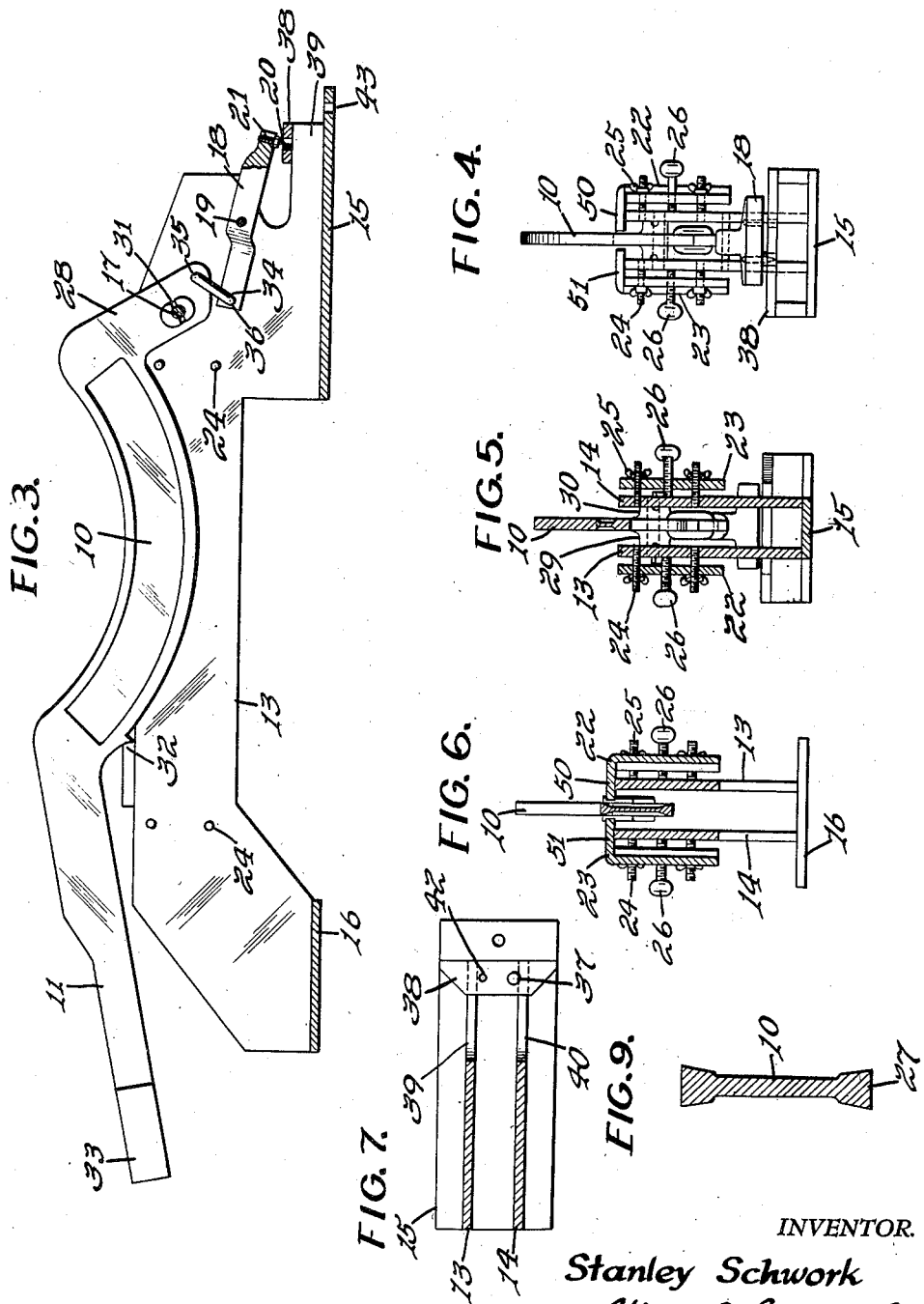
INVENTOR.
Stanley Schwork
BY *Victor J. Evans & Co.*
ATTORNEYS

UNITED STATES PATENT OFFICE 2,789,642
Patented Apr. 23, 1957

2,789,642

ALL PURPOSE ADJUSTABLE CUTTER

Stanley Schwork, Bangor, Pa.

Application November 26, 1954, Serial No. 471,185

1 Claim. (Cl. 164—44)

This invention relates to cutters for cutting or trimming building surfacing materials, such as slate, asbestos and asphalt shingles, and sheets of aluminum and the like, and in particular, a cutter having an arcuate cutting blade pivotally mounted in a base having spaced L-shaped guards and in which the cutting blade is linked to a punch for forming nail holes in the shingles or sheets of material.

The purpose of this invention is to provide a cutter for shingles and other building surfacing materials in which the cutter is readily adjustable to make it adapted for cutting different materials.

Conventional cutters for shingles and other building surface materials use pivotally mounted blades in combination with spaced coacting cutter bars, however, as the cutter bars are stationary, it is substantially impossible to adjust the bars to spread or contract the area between the bars in order to adapt the machine to different materials. In cutting some materials, such as slate, it is desirable to set the guard to cut a slot from ¼" to ½" in width whereas slots of different widths may be used in cutting asbestos and asphalt shingles.

With this thought in mind, this invention contemplates a cutting blade having a handle extended therefrom with one end of the blade pivotally mounted in a base and with the blade adapted to be moved downwardly with a shearing action between L-shaped guards mounted, at one end of the machine, on the base, and at the other on a T-shaped support whereby with the guides adjustably held by a combination of thumb and set screws a slot between the guides is readily adjustable.

The object of this invention is, therefore, to provide means for forming a cutter for building surfacing materials wherein the same cutter is adapted to be used for cutting different types of materials.

Another object of the invention is to provide a machine for cutting building surfacing materials having a cutting blade positioned between adjustable guides or guards in which the cutting blade is also adapted to actuate a punch for forming nail holes in the materials.

A further object of the invention is to provide a machine for cutting building wall surfacing materials, such as shingles and the like, in which the device is adapted to be adjusted to cut shingles of different materials and in which the device is of a simple and economical construction.

With these and other objects and advantages in view, the invention embodies spaced parallel walls carried by a base at one end and a support at the opposite end, an arcuate cutting blade pivotally mounted in the walls, L-shaped guards adjustably mounted on the walls and positioned to coact with the cutting blade, an anvil carried by the base and a lever for carrying punches of different sizes pivotally mounted in the base and connected to an extension of the blade with a link.

Other features and advantages of the invention will appear from the following description, taken in connection with the drawings, wherein:

Figure 1 is a side elevational view illustrating the improved building surfacing material cutter showing the cutting blade nested in the frame of the machine.

Figure 2 is a plan view of the machine with the parts in the positions as shown in Figure 1.

Figure 3 is a longitudinal section through the machine taken on line 3—3 of Figure 2 and also showing the arcuate cutting blade nested in the spaced parallel walls of the frame of the machine.

Figure 4 is an end elevational view of the machine looking toward the forward end upon which the punch is positioned.

Figure 5 is a cross section through the machine taken on line 5—5 of Figure 1 illustrating the thumb screws and threaded studs for adjusting positions of the guards at the sides of the cutting blade.

Figure 6 is a cross section through the machine taken on line 6—6 of Figure 1 also showing the relative positions of the guards and cutting blade.

Figure 7 is a sectional plan taken on line 7—7 of Figure 1 showing the base upon which one end of the machine is mounted and also illustrating the anvil that is adapted to coact with the punching element for forming nail holes in shingles and the like.

Figure 8 is a longitudinal section through the forward end of the machine taken substantially on line 3—3 of Figure 2 showing the punch carrying lever and arcuate blade in upwardly extended positions.

Figure 9 is a detail showing a cross section through the cutting blade with the blade shown on an enlarged scale.

Referring now to the drawings, wherein like reference characters denote corresponding parts, the improved building surfacing material cutter of this invention includes an arcuate cutting blade 10 having a handle 11, spaced parallel bars 13 and 14 carried by spaced walls on a base 15 at one end and similar spaced walls on a support 16 at the opposite end, a pin 17 by which the blade 10 is pivotally mounted in the walls of the face, a lever 18 also pivotally mounted, with a pin 19 between the walls of the face and having a punch 20 threaded in an opening 21 at the forward end thereof, and L-shaped guards 22 and 23 suspended from the walls 13 and 14 with threaded studs 24 having wing nuts 25 thereon and clamped against the nuts of the studs with thumb screws 26.

The cutting blade 10, as illustrated in Figure 9, may be provided in different designs wherein the cutting edge 27 is beveled providing clearance for a thin web, to which thin web the lead line to the numeral 10 points, and as an illustration, the web may be ¼" in thickness with a ¼" beveled pitch and the blade may also be flat with a width of 1" for clearance. The latter blade may also be provided with a reinforcing rib and although the thicknesses are suggested in inches it will be understood that the parts of the blades may be of different thicknesses.

The blade 10 is provided with a shank 28 through which the pin 17 extends and, as illustrated in Figure 5, the shank is provided with a hub having portions 29 and 30 having oil grooves, as indicated by the numeral 31, therein. The opposite end of the blade is provided with a cutter lip or tooth 32 to prevent strips cut off of shingles and the like from curling or dragging and the extended end of the handle 11 is provided with gripping elements 33 providing a drop that prevents the knife or blade quivering.

The lever 18 is pivotally connected to the extended end of the shank 28 of the blade 10 with a link 34 one end of which is secured in an opening 35 in the shank of the blade and the other in an opening 36 in the lever and as the lever is moved downwardly from the position shown in Figure 8 to that shown in Figure 3, by the downward movement of the cutting blade, a punch 20 on the forward end of the lever enters an opening 37 in an anvil 38 that is mounted on arms 39 and 40 extended from the forward ends of the walls 13 and 14. The extended end of the lever 18 is also provided with an additional threaded opening, as indicated by the numeral 41, and a punch of a different size may be threaded in the opening 41 whereby the punch will be positioned to coact with an opening 42 in the anvil 38.

The extended end of the base 15 is provided with an opening 43 and similar openings 44 and 45 are provided in the support 16 to provide means for anchoring the cutter to a roof, plank or the like.

The guards 22 and 23, which are L-shaped in cross section having vertically positioned legs and horizontally disposed arms, and which are supported by the studs 24, are provided with flanges through which the studs extend with flanges 46 and 47 on the guard 22 and 48 and 49 on the guard 23. The inner ends of the studs 24 are secured in the walls or bars connecting the walls 13 and 14 and the studs, which extend through openings in the flanges of the guards 22 and 23, are retained in position with thumb nuts 25. The thumb screws 26, which are threaded in the flanges of the guards, urge the flanges outwardly in clamping relation with the thumb nuts 25, as shown in Figure 5.

By this means the positions of the edges of the horizontally disposed arms of the L-shaped guards are adjustable in relation to the cutting blade to facilitate cutting different materials, and for cutting certain materials the guard on one side may be removed so that only one guard is used. As wear on the portions of the guards spaced from the pivotal mounting of the blade is greater than the wear on the opposite ends the guards are adapted to be turned around and positioned on opposite sides of the blade.

With the parts assembled as shown and described, shingles or other units of building materials, such as slate, asbestos, asphalt, or aluminum, may be positioned upon flanges 50 and 51 of the guards 22 and 23 with the cutting blade 10 extended upwardly and with the elements retained in position the blade is drawn downwardly trimming an edge of a unit or cutting a unit to a desired size.

It will be understood that modifications, within the scope of the appended claim, may be made in the design or arrangement of the parts without departing from the spirit of the invention.

What is claimed is:

In a sheet material cutter, the combination which comprises an arcuate cutting blade, a pair of oppositely disposed spaced L-shaped guards having vertically positioned legs and horizontally disposed arms and positioned with the legs spaced outwardly from the cutting blade and the arms extended inwardly toward the blade, a base having spaced walls positioned at one end of the cutter, a support having spaced walls positioned at the opposite end of the cutter, parallel bars extended between the base and support, vertically spaced threaded studs carried by the walls of the base and support and extended through openings in the legs of the guards, nuts threaded on said studs, thumb screws threaded in the legs of the guards, positioned between the studs, and extended to bear against outer surfaces of the walls of the base and support for clamping the guards in adjusted positions in relation to the cutting blade, said studs and thumb screws also permitting the removal of one of said guards, said arcuate cutting blade having a hub positioned between the horizontally disposed arms of the L-shaped guards and mounted with the hub between the walls of the base, a pin extended through the hub and walls for pivotally mounting the cutting blade, the hub providing stabilizing means for retaining the cutting blade in shearing relation to the coacting edges of the horizontally disposed arms of the guards, said cutting blade having a handle extended from the end opposite to the end pivotally mounted between the walls and base.

References Cited in the file of this patent

UNITED STATES PATENTS

| 63,398 | Lamplugh | Apr. 2, 1867 |
| 363,524 | Libbey | May 24, 1887 |
| 562,051 | Van Pelt | June 16, 1896 |
| 786,692 | Ohl | Apr. 4, 1905 |
| 1,166,578 | Clark | Jan. 4, 1916 |
| 2,355,320 | Nebel | Aug. 8, 1944 |
| 2,593,144 | Hercik | Apr. 15, 1952 |

FOREIGN PATENTS

| 60,493 | France | Apr. 21, 1954 |